United States Patent [19]

Suhr

[11] Patent Number: 5,027,478
[45] Date of Patent: Jul. 2, 1991

[54] COILING CLAMP FOR LINEAR FLEXIBLE MATERIAL

[76] Inventor: Robert N. Suhr, 431 Chowning Pl. NW., Marietta, Ga. 30065

[21] Appl. No.: 93,097

[22] Filed: Aug. 31, 1987

Related U.S. Application Data

[63] Continuation of Ser. No. 824,532, Jan. 31, 1986, abandoned.

[51] Int. Cl.⁵ .............................................. A44B 21/00
[52] U.S. Cl. .................................. 24/16 R; 24/30.55; 24/339; 24/570; 137/355.16
[58] Field of Search .................. 248/51, 80; 24/16 R, 24/16 PB, 336, 339, 129 R, 129 D, 115 H, 545, 570, 555, 571, 30.55; 174/41, 43, 46; 138/106, 109, 112; 137/355.28

[56] References Cited

U.S. PATENT DOCUMENTS

| D. 235,850 | 7/1975 | Diforte Jr. ................ 174/146 X |
| 268,407 | 12/1882 | Hughes ..................... 24/129 R X |
| 277,374 | 5/1883 | Strohm ........................... 174/146 |
| 282,489 | 8/1883 | Breen ........................ 174/146 X |
| 978,398 | 12/1910 | Rishcard . |
| 1,816,301 | 7/1931 | Sundell . |
| 2,292,140 | 8/1942 | Lofgren ....................... 24/129 D |
| 2,983,014 | 5/1961 | Greenwood . |
| 3,476,868 | 11/1969 | William et al. ............... 174/146 x |
| 3,636,595 | 1/1972 | Wines ............................ 24/339 X |
| 3,654,668 | 4/1972 | Appleton ................... 24/130 R X |
| 4,707,892 | 11/1987 | Nelson .............................. 24/336 |

FOREIGN PATENT DOCUMENTS

| 1003303 | 2/1957 | Fed. Rep. of Germany ...... 174/146 |
| 2736730 | 2/1979 | Fed. Rep. of Germany ... 24/129 D |
| 510671 | 2/1955 | Italy .................................. 24/339 |
| 560916 | 4/1959 | Italy .................................. 24/339 |
| 1176805 | 1/1970 | United Kingdom .................. 24/336 |

*Primary Examiner*—James R. Brittain
*Attorney, Agent, or Firm*—Hurt, Richardson, Garner, Todd & Cadenhead

[57] ABSTRACT

A coiling clamp for linear flexible material is formed as a unitary plastic, metal or wooden body member having circumferentially spaced outwardly opening receiving recesses which may be of different sizes to receive different sizes of the linear material such as garden hose, electrical extension cords, water-ski ropes and the like.

11 Claims, 4 Drawing Sheets

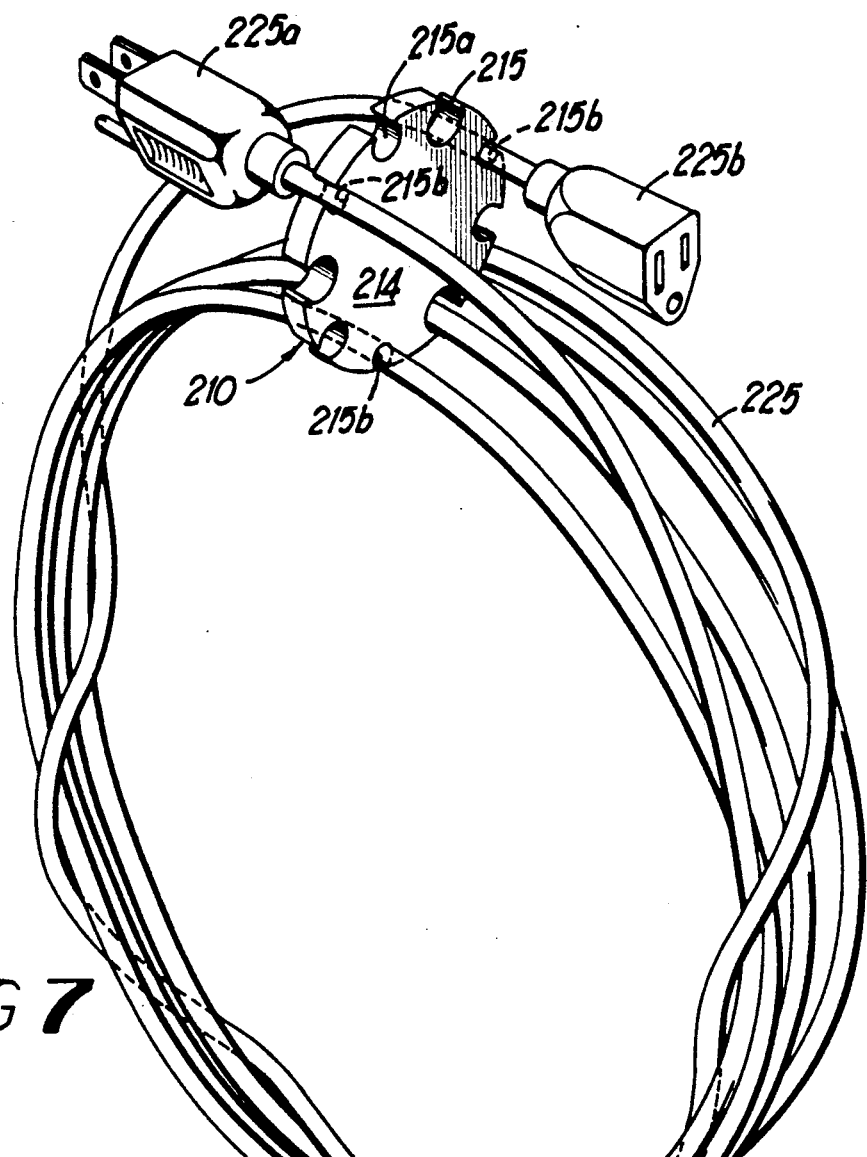
FIG 7
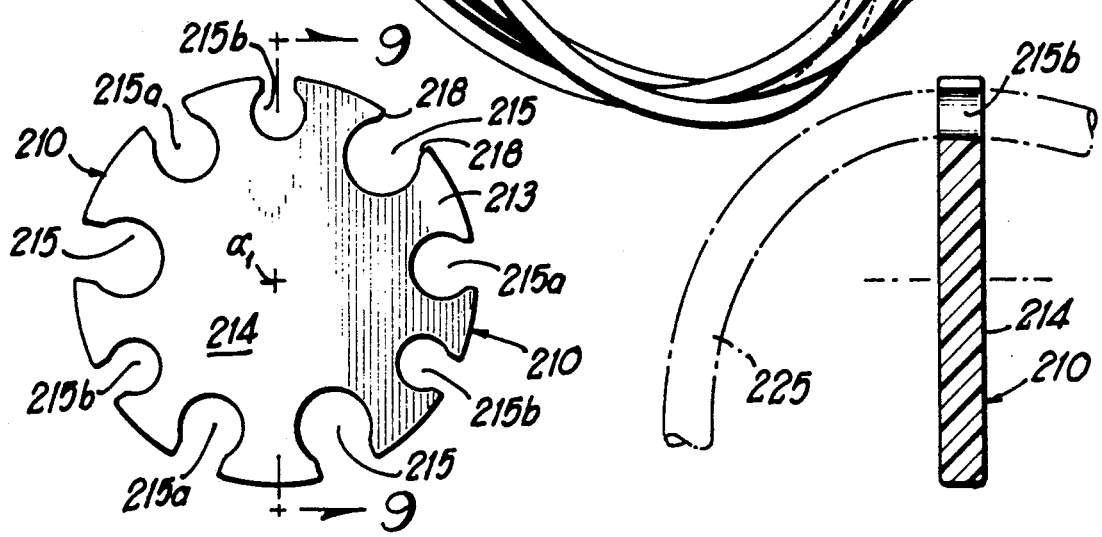
FIG 8
FIG 9

COILING CLAMP FOR LINEAR FLEXIBLE MATERIAL

This is a continuation of co-pending application Ser. No. 824,532 filed on 01/31/86, abandoned.

BRIEF SUMMARY OF THE INVENTION

This invention relates to a clamp for coiling linear flexible material such as hose, tubing, wire, and cord, and is more particularly concerned with a clamp for resiliently holding in a coiled arrangement, a garden hose, electrical extension cord, ski rope, or the like.

In the past, numerous garden hose clamps have been devised U.S. Pat. No. 3,636,595 discloses a coiling clip for storing garden hoses, the clip being formed of metal and having U-shaped sockets through which spaced portions of the garden hose pass. U.S. Pat. No. 1,816,301 discloses still another type of hose clamp in which a garden hose is clamped by opposed loop portions so as to be held in a coiled condition. U.S. Pat. No. 978,398 discloses a form of hose clamp in which handcuff type elements hold segments of the hose together. Each of the prior art hose clamps described above is formed of metal having successive clamps for receiving sections of hose clamped in generally a common horizontal plane.

Cord or cable holders for electrical extension cords, or the like, have also been also devised. U.S. Pat. No. 2,143,529 discloses a holder for both a portable electric appliance and its flexible current supply leads. The device of U.S. Pat. No. 2,143,529 does not lend itself to various size electrical cords and is not suitable for the typical extension cords that are fifty (50), seventy-five (75) or one hundred (100) feet in length.

U.S. Pat. No. 4,123,012 discloses a cord or cable holder where the cord must be wound onto the holder for storage and then wound off the holder before being used.

Rope holders for water-ski ropes and clotheslines have also been devised. U.S. Pat. No. 3,926,383 discloses a ski rope holder, which is large and fixed to a boat, the holder being rotated to release the rope. U.S. Pat. No. 3,813,055 discloses a water-ski rope reel rotated by hand. U.S. Pat. No. 3,028,829 discloses a water-ski rope, reel affixed to back of a boat. U.S. Pat. No. 3,147,935 discloses a water-ski rope, and reel affixed to boat. U.S. Pat. No. 3,831,545 discloses a water-ski rope winch attached to boat. U.S. Pat. No. 3,195,831 discloses a water-ski rope reel mounted on boat.

Briefly described, the present invention includes a unitary elastomeric body member preferably formed of plastic or some other moldable, resilient material. This body member has a generally circular or disc shaped configuration with a plurality of outwardly opening cavities or recesses, circumferentially spaced from each other, in the peripheral portion of the disc. The recesses may be of different sizes as to be available for receiving different sizes of garden hoses, electric cables, cords, or ropes.

Accordingly, it is an object of the present invention to provide a coiling clamp which is inexpensive to manufacture, durable in structure and efficient in operation.

Another object of the present invention is to provide a coiling clamp that allows the coiled hose, cable, cord, tube, or rope to be quickly released for use without having to unwind it from a reel, or the like.

Another object of the present invention is to provide a coiling clamp which has no moving parts and which can be readily packaged for display and sale.

Another object of the present invention is to provide a coiling clamp which can fit a plurality of size hoses, cables, cords, tubes, or rope so as to retain them in a coiled condition.

Another object of the present invention is to provide a coiling clamp which will not rust, does not readily break and requires no adjustment.

Another object of the present invention is to provide a coiling clamp which can be readily and easily stored when not in use.

Another object of the invention is to provide a coiling clamp which is permanently attached to the linear flexible material with openings sized exactly to hold that particular material.

Other objects, features and advantages of the present invention will become apparent from the following description when taken in conjunction with the accompanying drawing wherein like characters of reference designate corresponding parts throughout the several views.

DESCRIPTION OF THE DRAWING

FIG. 7 is a perspective view of a third embodiment of the present invention showing a clamp with three sizes of recesses, one size of recess receiving a selected size of cable or cord in a coiled condition therein;

FIG. 8 rear elevational view of the clamp illustrated in FIG. 7;

FIG. 9 is a cross-sectional view taken substantially along line 9—9 and FIG. 8;

DETAILED DESCRIPTION

Figure 1:
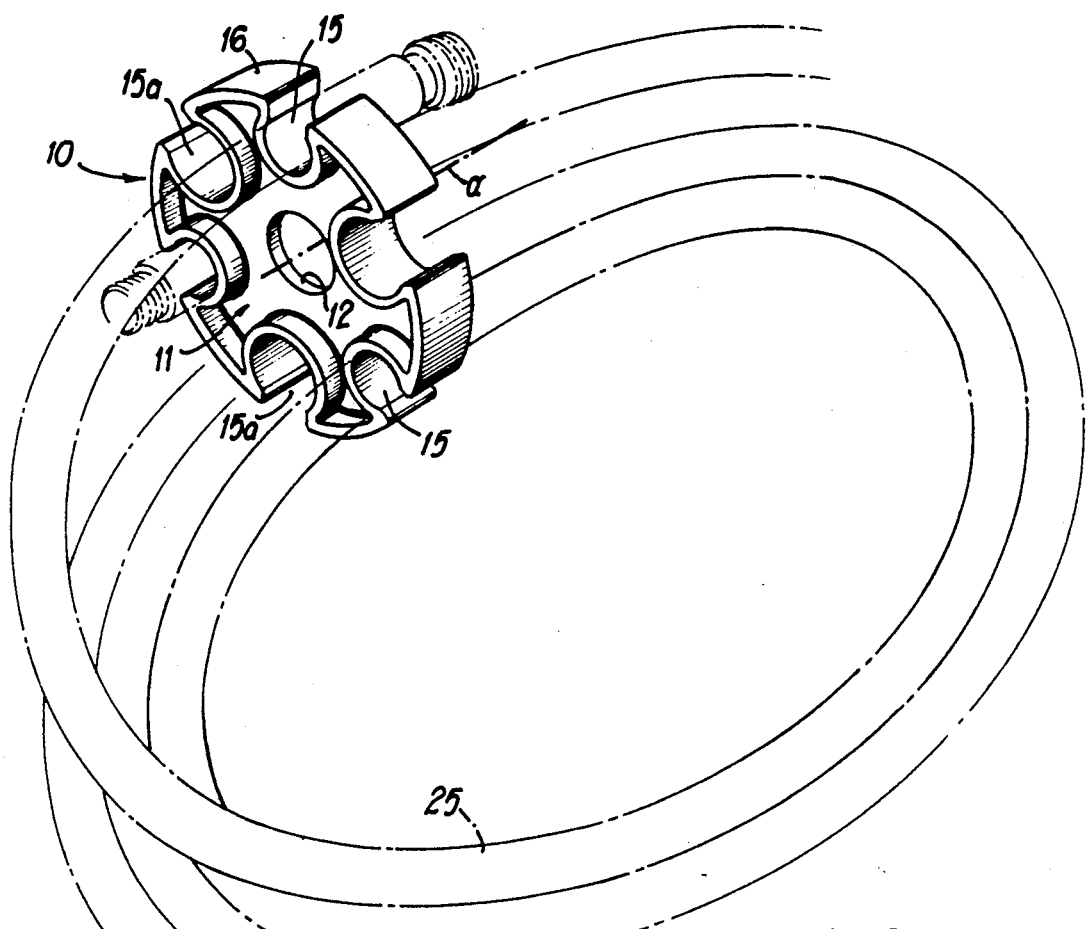
FIG. 1 is a perspective view of one form of coiling clamp constructed in accordance with the present invention, receiving a linear flexible hose illustrated by broken lines.
Figure 2:
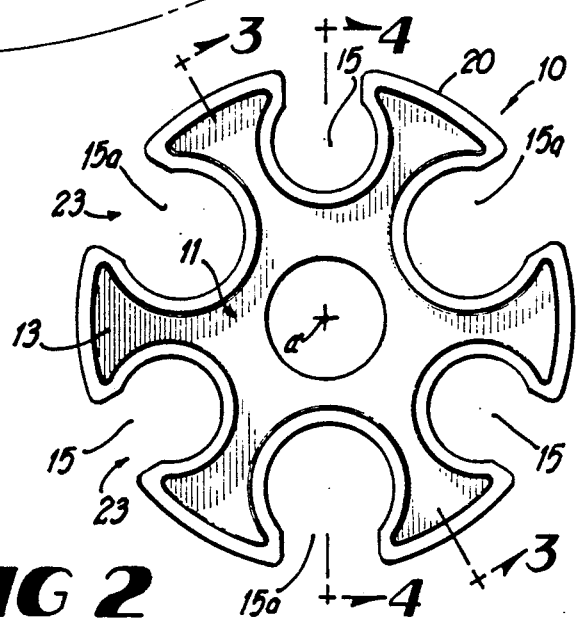
FIG. 2 is a front elevational view of the clamp depicted in FIG. 1.

Referring now in detail to the embodiments chosen for the purpose of illustrating the present invention, it being understood that in its broader aspects, the present invention is not limited to the exact details herein depicted, numeral 10 in FIGS. 1-5 denotes generally a coiling clamp which is a unitary elastomeric, circular or disc shaped body member which is preferably injection molded to the shape shown in FIGS. 1-5. This coiling clamp 10 includes a flat relatively thin disc or circular or annular web or body plate 11 having a central circular hole or opening 12. The web or plate 11 is a flat planar member having parallel inner and outer surfaces. The plate 11 is generally star shaped, having six identical circumferentially spaced peripheral arms 13 which radiate from a central hub 14. Opposed adjacent arms 13, define, therebetween, cylindrical, outwardly opening opening, i.e., material receiving cavities or recesses 15 and 15a.

Extending along the perimeter defined by arms 13 is an axially extending wall assembly 16. This wall assembly 16 is of uniform thickness and width and protrudes an equal distance on both side of the flat web or plate 11. Thus, each cavity or recess 15 is defined by a C-shaped cylindrical cavity defining wall or segment 17 which is a part of the wall assembly 16 and which extends in an outwardly facing arc of more than 180° and usually less than about 280°, preferably about 260°. In like fashion, the cavities or recesses 15a are defined by similar but larger C-shaped outwardly facing cylindrical cavity defining walls or segments 17a which are also a part of the wall assembly 16 and which also extend between about 180° and about 280°, preferably about 260°. The end portions of the walls 17 and 17a respectively merge with straight, spaced, parallel, opposed pairs of guide walls 18, 18a and 19, 19a, to define hose receiving mouths 23, 23a. Each mouth 23 has a width or mouth distance $D_1$ between the opposed parallel pairs of walls 18, 18a which is less than the diameter $D_2$ of the recess or cavity 15 and each mouth 23a has a width or distance $D_3$ between the walls 19, 19a which is less than the diameter $D_4$ of the cavity 15a. These widths $D_1$ and $D_3$ are, however, slightly less than the diameter of the hose 25 to be received so that a crosssectional portion of the resilient and linear flexible hose 25 must be slightly deformed as it is inserted inwardly through the mouth and into a recess 15 or 15a. Thus, spaced cross-sectional portions or increments of the hose 25 are snuggly releasably retained by the circular or arcuate inner surfaces of walls 17 or 17a, as the case may be.

Extending between the outer ends of guide walls 18, 18a and their next adjacent guide walls 19, 19a as part of wall assembly 16 are arcuate outer peripheral wall sections or segments 20, the respective outer wall segments 20 being concentric along a common circle which is also concentric with the hole 12 about axis $\alpha$.

The guide walls 18 and 18a of each pair of opposed guide walls are equally spaced on opposite sides of a radius passing from axis through axis $\alpha$ of their recess 15. In like fashion each pair of walls 19 and 19a are equally spaced on opposite sides of a radius extending from axis $\alpha$ through axes $\beta$ of their recess 15a.

Garden hoses, such as hose 25 come in various sizes including the more popular sizes: ⅝" outside diameter and ¾" outside diameter. Therefore, the diameter $D_2$ of each recess 15, i.e. wall 17, is about ⅝ inch and the diameter $D_4$ of each recess 15a or wall 17a should be about ¾ an inch. The space $D_1$ between the guide walls 18, 18a should be about 0.5 inch and the space $D_3$ between the guide walls 19, 19a should be about 0.63 inch. Furthermore, the width of the perimeter wall assembly 16 should be about 0.75 inch. The corners between the guide walls 18, 18a and 19, 19a and their respective wall segments 20 should be rounded, as at numeral 21. Thus, the recess defining walls, 17, 17a, the guide walls 18, 18a, 19, 19a and the outer wall segments 20 form the continuous wall assembly 16 surrounding the web 11.

The diameter $D_5$ of the wall segments 20 about axis $\alpha$ should be, about 3 inches and the distance $D_7$ of radii from axis $\alpha$ to axis $\beta$ should be about 1 inch. The distance $D_6$ from axis $\alpha$ to axis $\gamma$ should be about 1.06 inch. The axes $\alpha$, $\beta$, $\gamma$, are all parallel to each other and the adjacent axis $\beta$ and $\gamma$ are spaced by angle $\alpha$ approximately 60° circumferentially from each other.

Figure 6:
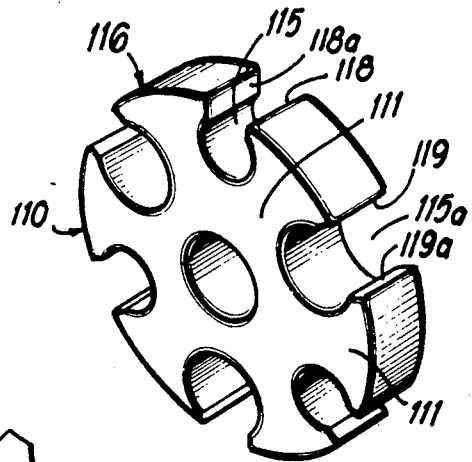
FIG. 6 is a perspective view of the modified form or second embodiment of a coiling clamp constructed in accordance with the invention.

In FIG. 6 is seen an alternative embodiment of the present invention which may be formed of wood, or plastic. When a plastic is employed, the device of FIG. 6 can be blow molded, if desired to produce a very inexpensive device. In more detail, the coiling clamp 110 depicted in FIG. 6 has a body member 111 having outer surfaces, such as surface 111a, which are spaced from and parallel to each other, the surfaces merging with the edges of the peripheral wall 116. Cavities 115 and 115a and guide walls 118, 118a, 119, 119a are of the same configuration as the cavities of 15 and 15a and guide walls 18, 18a, 19, 19a of the preceding embodiment. The embodiment of FIG. 6 functions in the same way as the embodiment of FIGS. 1-5 except that in this second embodiment of the coiling clamp 110, when blow molded or are formed of a foamed plastic will float and, therefore, is preferable to be used for coiling hoses which are in boat houses or are carried aboard ships or boats.

In use, if the hose 25 is of a smaller diameter, namely ⅝ inch (0.625 inch) outside diameter, the hose 25 is coiled by inserting one end portion cross-sectional increment of the hose 25 in a cavity 15, then the hose 25 is looped one time and a second intermediate cross-sectional increment or portion of the hose is passed into the second cavity 15. This first fixed loop is then rotated hand-over-hand to form additional loops of the approximate same diameter until the entire hose 25 is rolled up, without twisting the hose to create each loop. The cross-sectional end increment or portion of hose 25 is then inserted in the remaining cavity 15, or the last loop of hose can be wrapped around the previously formed groups of loops and then the end portion inserted in the remaining cavity 15 to cause the said loops to be held together in a neat package for storage or transportation.

Of course, if a larger hose, with a diameter of ¾ inch (0.750 inch) is employed, the flexible hose 25 is coiled in the identical fashion, as described above, except that the cavities 15a are employed in place of the cavities 15 for receiving the hose end portions and intermediate portion of the hose.

As illustrated in FIGS. 7-10, a third embodiment of the invention is for extension cords, such as cord or cable 225 and includes a unitary, elastomeric body member or clamp 210 which is a disc shaped, cylindrical member having nine circumferentially spaced arms 213 which radiate from a hub 214 to define between adjacent arms 213, nine cylindrical outwardly opening, cable receiving cavities or recesses 215, 215a and 215b, the recess 215 being adjacent to the recess 215a and the recess 215a being adjacent to the recess 215b, circumferentially around the periphery of the clamp 210. The clamp 210 has an axis $\alpha_1$.

Figure 10:
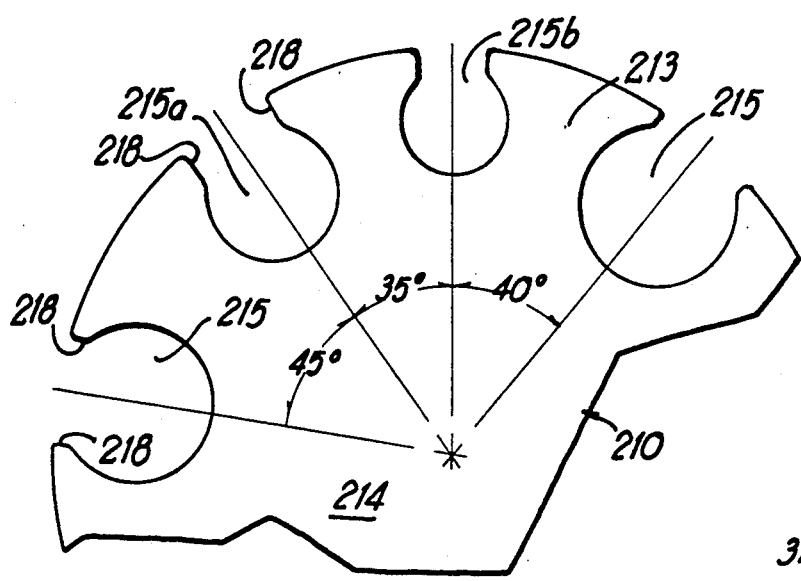
FIG. 10 is an enlarged fragementary front elevational view of the portion of the clamp illustrated in FIGS. 8 and 9.

Cavities or recesses 215, 215a, and 215b are C-shaped cylindrical cavities substantially identical to the therefrom. Each cavity 215, 215a or 215b opens outwardly cavities 15, and 15a except that they are of different sizes along the periphery and is defined, in part, by opposed parallel walls or shoulders 218 which are respectively spaced apart by a distance less than the diameter of their associated cavity. As depicted in FIG. 10, the cavities 215 and 215a are spaced apart by about 45°, the adjacent cavities 215a and 215b are spaced apart by about 35° and the adjacent cavities 215b and 215 are spaced apart by about 40°.

The diameter of each cavity 215b is approximately 0.300 inches for receiving the smallest diameter extension cord or cable 225, shown in FIG. 7., which contains sixteen gauge wire. The cavities 215a are each 0.340 inches in diameter for receiving the middle diameter extension cords (not shown) made of the next larger or fourteen gauge wire and cavities 215 are approximately 0.410 inches in diameter for receiving the largest diameter extension cords made of twelve gauge wire. The usual extension cord, such as cord 225, has a male plug 225a at one end and a female socket 225b at the other end.

When the clamp 210 is used, a cable, such as cable 225, is installed by inserting a cross-sectional increment of the cable, adjacent plug 225a, into one of the cavities which correspond to the size of the cable involved. In FIG. 7, the cable 225 is illustrate as being inserted into one of cavities 215b, and then looped one time and a second intermediate portion of the cable is passed into the second cavity 215b. Thereafter, the initial loop is employed as a guide to loop still additional portions of the extension cord 225 until for the last loop, the cable is wrapped around the previous formed loops in a serpentine fashion as shown in FIG. 7 and the last cross-sectional increment adjacent to the socket 225b is inserted in the last cavity 215b.

Figure 11:
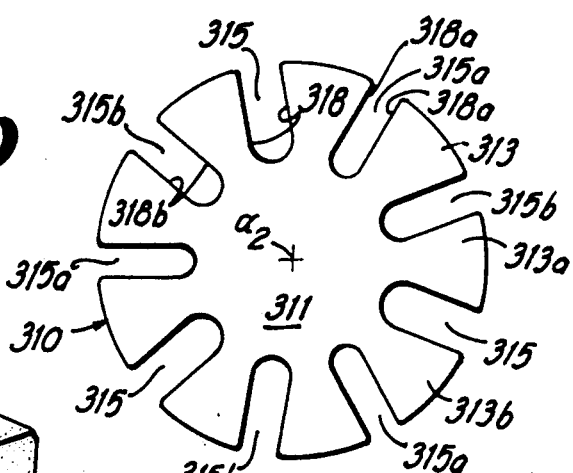
FIG. 11 is a front elevational view of a fourth embodiment of the present invention adapted for receiving flat cables.

In FIG. 11 is illustrated the fourth embodiment of the present invention which is particularly adapted to receive extension cords or cables (not shown) which are flat cables. In more detail the clamp 310 includes a round or circular disc shaped body with a flat web or plate 311 and center $a_2$. Arranged in circumferentially spaced relationship around the peripheral portion of clamp 10 are generally trapezoidal arms 313, 313a and 313b. These arms are separated by outwardly opening cable receiving recesses or cavities 315, 315a and 315b. Each of the cavities 315, 315a and 315b are defined by a pair of opposed parallel walls 318, 318a, 318b in plate 311 which extend from the periphery of the clamp 310 inwardly, in parallel relation to each other on opposite sides of a radius extending through the center axis $a_2$ of the cavity. The inner end of each cavity is semicircular so that the ends of the semicircular inner portion merge with the opposed walls, such as walls 318, 318a and 318b. The distance between the opposed walls 318 is usually 0.23 inches, which is the thickness of a flat cable extension cord made with twelve gauge wire; and 0.09 inches between walls 318a, which is the thickness of a flat extension cord with fourteen gauge wire and 0.15 inches between 318b, which is the thickness of the cable of an extension cord made of sixteen gauge wire.

In use, the flat extension cables (not shown) are installed in substantially the identical fashion as described for the preceding embodiment, the sixteen gauge wire employing the cavities 315b, the fourteen gauge wire employing the cavities 315a or the twelve-gauge wire employing the cavities 315, as the case may be. Surprisingly, the fourteen gauge flat wire extension cord is thinner in thickness and wider in width than the extension cords using sixteen gauge wire.

Figure 12:
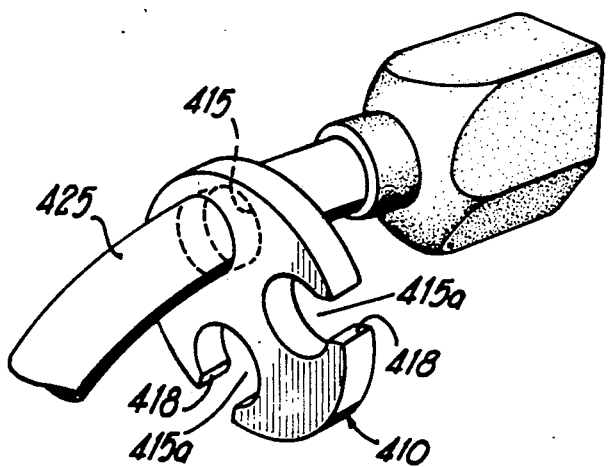
FIG. 12 is a fifth embodiment of the present invention showing a clamp permanently affixed to a cable for receiving other portions of the cable, when the cable is coiled.
Figure 13:
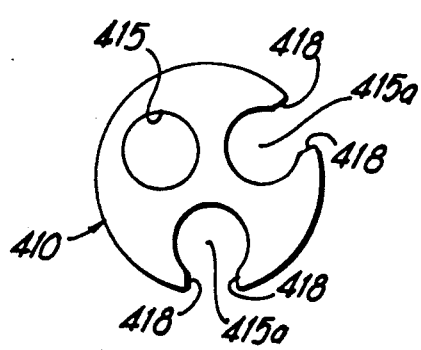
FIG. 13 is a front elevational view of the clamp illustrated in FIG. 12.
Figure 3:
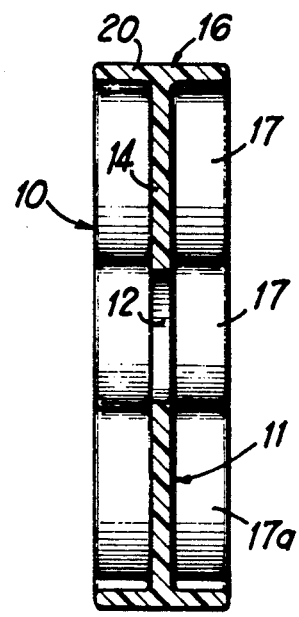
FIG. 3 is a cross-sectional view substantially along line 3—3 in Fi 2.
Figure 4:
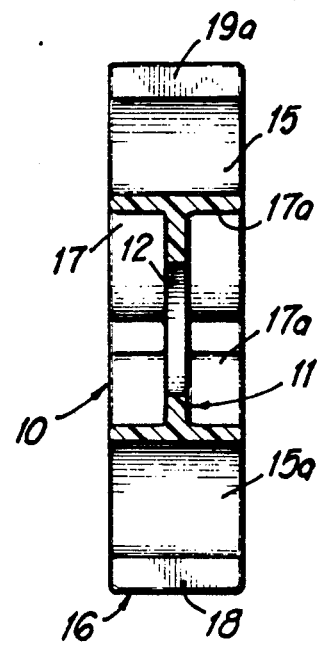
FIG. 4 is a cross-sectional view substantially along line 4—4 in 2.
Figure 5:
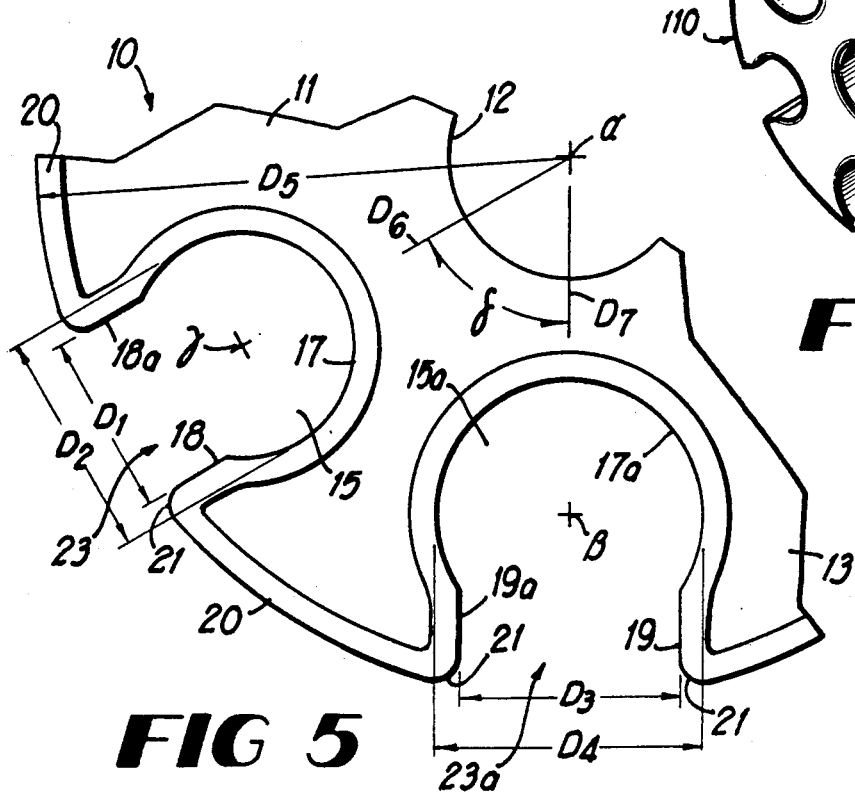
FIG. 5 is an enlarged fragmentary front elevational view of a portion o clamp of FIG. 2

The fifth embodiment of the present invention is illustrated in FIGS. 12 and 13. From this embodiment it is seen that, if desired, one end portion of a cable, such as cable 425, can be permanently affixed in a closed cavity such as cavity 415 in a disc-shaped clamp 410. In this embodiment, only two outwardly opening cavities 415a are provided, these cavities being circumferentially spaced from each other by 120° and circumferentially spaced from the cavity 415 by 120°. The cavities 415a are substantially identical to the cavities 215 and each opens outwardly, having opposed shoulders or walls such as shoulder 418 which are parallel to each other and spaced apart by a distance less than the diameter of the cavity 415a. Thus, an intermediate portion of the cable 425 can be inserted through one of the openings of one of the cavities 415a and an increment adjacent to the opposite end of the cable 415 received in the other cavity 415a, the cable 425 being coiled in the same manner as the cable 225.

While I have illustrated a hose 25 and electrical cables 225 and 425 for illustrating the linear flexible material which can be retained in my clamps, it will be understood by those skilled in the art that various linear flexible materials, such including tubes and conduits can be installed in my clamps.

It will be obvious to those skilled in the art that many variations may be made in the embodiments here chosen for the purpose of illustrating the present invention without departing from the scope thereof as defined by the appended claims.

We claim:
1. A coiling clamp assembly, comprising:
  (a) a relatively rigid body member having a periphery and at least three equal diameter recesses in said body member, said recesses being disposed in circumferentially spaced relationship to each other around and adjacent to said periphery;
  (b) said body member having spaced pairs of opposed guide walls projecting outwardly from each of said recesses for defining outwardly opening mouths communicating respectively with said all of said recesses;
  (c) said body member also having arcuate recess defining walls inwardly of said guide walls for defining respectively said recesses, the ends of each recess defining wall being connected to the inner ends of its associate pair of guide walls;
  (d) the width of each of said mouths from one of its pair of guide walls to the other of its pairs of guide walls being less that the widths of its associated recess; and said body member having outer wall segments extending between adjacent guide walls of adjacent pairs of guide walls, said outer wall segments being spaced from each other around the periphery of said body member; and
  (e) a length of linear flexible relatively resilient garden hose of a diameter approximately equal to the diameter of said recesses coiled about said body member, one end portion of said garden hose being releasably received through one of said mouths into one of said recesses, the other end portion of said garden hose being releasably received through another of said mouths into another of said recesses and an intermediate portion of said garden hose being releasably received through still another of said mouths into still another of said recesses, whereby said clamp frictionally retains said garden hose in a coiled condition within the recesses, the portions of said hose being deformed inwardly when passing through their respective mouths into and out of said recesses.

2. The coiling clamp assembly defined in claim 1 wherein said body member is a blow mold member having a hollow interior.

3. A coiling clamp assembly comprising:
(a) a relatively rigid body member having a periphery about an axis and at least three equal diameter recesses in said body member, said recesses being disposed in circumferentially spaced relationship to each other around and adjacent to said periphery;
(b) said body member having spaced pairs of opposed guide walls projecting outwardly from the walls of at least two of said recesses for defining outwardly opening mouths communicating respectively with said at least two of said recesses;
(c) said body member also having arcuate recess defining walls inwardly of said guide wall for defining respectively said at least two of said recesses, the ends of said recess defining wall being connected to the inner ends of its associate pair of guide walls;
(d) the width of each of said mouths from one of its pair of guide walls to the other of its pairs of guide walls being less that the width of its associated recess; and said body member having outer wall segments extending between adjacent guide walls of adjacent pairs of guide walls, said outer wall segments being spaced from each other around the periphery of said body member;
(e) a length of linear flexible relatively resilient garden hose of a diameter approximately equal to the diameter of said recesses coiled about said body member, one end portion of said garden hose being received by the third recess of said recesses, the other end portion and an intermediate portion of said garden hose being releasably received respectively in said two of said recesses, whereby said clamp retains said garden hose in a coiled condition;
(f) said recess defining walls having arcuate surfaces respectively defining said recesses, said recesses being of different dimensions whereby the diameter of one group of recesses is different from the diameter of another group of recesses and whereby the recesses of one group are circumferentially between the recesses of the other group around said axis; and
(g) the respective diameters of the recesses of said one group of recesses is approximately ⅝ inch and the respected diameters of the recesses of said other group is approximately ¾ inch.

4. A coiling clamp assembly comprising:
(a) A relatively rigid body member having a periphery about an axis and at least three equal diameter recesses in said body member, said recesses being disposed in circumferentially spaced relationship to each other around and adjacent to said periphery;
(b) said body member having spaced pairs of opposed guide walls projecting outwardly from the walls of at least two of said recesses for defining outwardly opening mouths communicating respectively with said at least two of said recesses;
(c) said body member also having arcuate recess defining walls inwardly of said guide wall for defining respectively said at least two of said recesses, the ends of each recess defining wall being connected to the inner ends of its associate pair of guide walls;
(d) the width of each of said mouths from one of its pair of guide walls to the other of its pairs of guide walls being less that the width of its associated recess; and said body member having outer wall segments extending between adjacent guide walls of adjacent pairs of guide walls, said outer wall segments being spaced from each other around the periphery of said body member;
(e) a length of linear flexible relatively resilient garden hose of a diameter approximately equal to the diameter of said recesses coiled about said body member, one end portion of said garden hose being received by the third recess of said recesses, the other end portion and an intermediate portion of said garden hose being releasably received respectively in said two of said recesses, whereby said clamp retains said garden hose in a coiled condition;
(f) said recess defining walls have arcuate surfaces respectively defining said recesses, said recesses being of different dimensions whereby the diameter of one group of recesses is different from the diameter of another group of recesses and whereby the recesses of one group are circumferentially between the recesses of the other group around said axis; and
(g) a third group of recesses and in which the respective diameters of the recesses of said one group is approximately 0.410 inch, the respective diameters of said other group is approximately 0.340 inches and the respective diameters of said third group is approximately 0.300 inches.

5. A coiling clamp assembly comprising:
a relatively rigid body member having a periphery and at least three equal diameter recesses in said body member, said recesses being disposed in circumferentially spaced relationship to each other around and adjacent to said periphery;
(b) said body member having spaced pairs of opposed guide walls projecting outwardly from the walls of at least two of said recesses for defining outwardly opening mouths communicating respectively with said at least two of said recesses;
(c) said body member also having arcuate recess defining walls inwardly of said guide wall for defining respectively said at least two of said recesses, the ends of each recess defining wall being connected to the inner ends of its associated pair of guide walls;
(d) the width of each of said mouths from one of its pair of guide walls to the other of its pairs of guide walls being less that the width of its associated recess; and said body member having outer wall segments extending between adjacent guide walls of adjacent pairs of guide walls, said outer wall segments being spaced from each other around the periphery of said body member;
(e) a length of linear flexible relatively resilient garden hose of a diameter approximately equal to the diameter of said recesses coiled about said body member, one end portion of said garden hose being received by the third recess of said recesses, the other end portion and an intermediate portion of said garden hose being releasably received respectively in said two of said recesses, whereby said clamp retains said garden hose in a coiled condition; and (f) said recesses composing six circumferentially spaced recesses and three of said recesses having a diameter of about ⅝ inch, and three other recesses having a diameter of about ¾ inch.

6. A coiling clamp assembly comprising:
(a) A relatively rigid body member having a periphery and at least three equal diameter recesses in said body member, said recesses being disposed in circumferentially spaced relationship to each other around and adjacent to said periphery;
(b) said body member having spaced pairs of opposed guide walls projecting outwardly from the walls of at least two of said recesses for defining outwardly opening mouths communicating respectively with said at least two of said recesses;
(c) said body member also having arcuate recess defining walls inwardly of said guide wall for defining respectively said at least two of said recesses, the ends of each recess defining wall being connected to the inner ends of its associate pair of guide walls;
(d) the width of each of said mouths from one of its pair of guide walls to the other of its pairs of guide walls being less that the width of its associated recess; and said body member having outer wall segments extending between adjacent guide walls of adjacent pairs of guide walls, said outer wall segments being spaced from each other around the periphery of said body member;
(e) a length of linear flexible relatively resilient garden hose of a diameter approximately equal to the diameter of siad recesses coiled abut said body member, one end portion of said garden hose being received by the third recess of said recesses, the other end portion and an intermediate portion of said garden hose being releasably received respectively in said two of said recesses, whereby said clamp retains said garden hose in a coiled condition; and
(f) said recesses composing a total of nine spaced recesses each provided with a mouth opening outwardly and three of siad recesses having a diameter of about 0.410 inches, three of said other recesses having a diameter of about 0.340 inches and three of said other recesses have a diameter of about 0.300 inches.

7. A coiling clamp assembly comprising:
a generally flat plate having a central axis and a linear resilient flexible garden hose, said plate having a plurality of spaced cavities circumferentially spaced from each other around said central axis, at least some of said cavities being defined by wall portions of said plate, said cavities being defined by wall portions of said plate and having transverse axes which are generally parallel to each other and parallel to said central axis, the size of said cavities corresponding to cross-sectional increments of said garden hose, and end portions and an intermediate portion of said garden hose being received respectively in said cavities, at least one of said end portions and said intermediate portion of said garden hose being removeable from and frictionally retained by said cavities which open outwardly.

8. A coiling clamp assembly comprising:
(a) a relatively rigid body member having a periphery and at least three equal diameter recesses in said body member, said recesses being disposed in circumferentially spaced relationship to each other around and adjacent to said periphery;
(b) said body member having spaced pairs of opposed guide walls projecting outwardly from the walls of at least two of said recesses for defining outwardly opening mouths communicating respectively with said at least two of said recesses;
(c) said body member also having arcuate recess defining walls inwardly of said guide wall for defining respectively said at least two of said recesses, the ends of each recess defining wall being connected to the inner ends of its associate pair of guide walls;
(d) the width of each of said mouths from one of its pair of guide walls to the other of its pair of guide walls being less that the width of its associated recess; and said body member having outer wall segments extending between adjacent guide walls of adjacent pairs of guide walls, said outer wall segments being spaced from each other around the periphery of said body member;
(e) a length of linear flexible relatively resilient garden hose of a diameter approximately equal to the diameter of said recesses coiled about said body member, one end portion of said garden hose being received by the third recess of said recesses, the other end portion and an intermediate portion of said garden hose being releasably received respectively in said two of said recesses, whereby said clamp retains said garden hose in a coiled condition; and
(f) said body member being circular and being provided with three additional recesses, each additional recess being of a diameter different from the diameter of the first mentioned recesses, whereby said body member has a first group of recesses formed from the first mentioned recesses and a second group of recesses of a different diameter than the diameter of the first mentioned recesses, said body member also being provided with additional guide walls defining outwardly opening mouths communicating respectively with said additional recesses.

9. The coiling clamp assembly as defined in claim 8 the recesses of one group being alternatively disposed with respect to the recesses of the second group.

10. A coiling clap assembly comprising a flexible, resilient, deformable garden hose of a round uniform diameter throughout its length, said garden hose being of a diameter of approximately ⅝ inch or approximately ¾ inch, fitting on the ends of said garden hose, and a coiling clamp for receiving said hose in a coiled condition; said coiling clamp including a relatively rigid body member as compared with rigidity of said hose, said body member having an edge portion, there being three spaced circular first recesses in said body member disposed adjacent to and inwardly of said edge portion, said first recesses being approximately ⅝ inch in diameter for respectively snuggly retaining cross-sectional portion of said garden hose in the event that said garden hose is of a diameter of ⅝ inch, one of siad first recesses being for retaining a cross-sectional portion of said hose which is adjacent to one of said fittings, another of said first recesses being for retaining an intermediate cross-sectional portion of said hose, the third of said filter recesses being for retaining a cross-sectional portion of said hose which is adjacent to the other of said fittings, said body member having first throat portions respectively adjacent to and associated with and communicating respectively with said first recesses for forming pathways respectively opening into said first recesses and also opening outwardly of said body member through which the cross-sectional portion of said hose of a ⅜ inch diameter are respectively inserted into their associated first recesses when said hose of a ⅝ inch diameter is in a stored condition and through which said cross-sectional portions of said hose of a ⅝ inch diameter are removed from said body member, each of said first throat portions being of a width sufficiently less than the diameter of its associated first recess that the cross-sectional portion of said hose when removed from said first recess is deformed inwardly as said cross-sectional portion is passed through the first throat, said hose of a diameter of ⅝ inch being sufficiently resilient that its cross-sectional portions return to their round conditions after passing outwardly through said throats, said body member having spaced circular second recesses adjacent to and inwardly of said edge portion for the receiving cross-sectional portions of said garden hose, in the event said hose is ¾ inches in diameter, said second recesses being respectively disposed between said first recesses, one of said second recesses being for retaining a cross-sectional portion of said hose of a diameter of ¾ inches which is adjacent to one of said fittings, another of said second recesses being for receiving an intermediate cross-sectional portion of said hose of a diameter of ¾ inches, a third of said second recesses being for retaining a cross-sectional portion of said hose which is adjacent to the other of siad fittings, said body member having second throat portions respectively adjacent to and associated with and communicating respectively with said second recesses for forming second pathways respectively opening into said second recesses and also opening outwardly of said body member and through which the cross-sectional portions of said hose are respectively inserted when said hose of a ¾ inch diameter in a stored condition, and through which said cross-sectional portions of said hose of a ¾ inch diameter pass when such cross-sectional portions are removed from said body portions, each of said second throat portions being of a width sufficiently less than the diameter of its associated second recesses that the cross-sectional portion retained in such recess will be deformed inwardly as such cross-sectional portion passes through the second throat, said hose of a diameter of ¾ inch being sufficiently resilient that its cross-sectional portions returns to their round condition after passing outwardly through the second throat.

11. The coiling clamp assembly defined in claim 10 wherein said body member has a hollow interior.

* * * * *